April 4, 1961  R. W. GRAHAM  2,978,586
ROTATIONAL INDICATOR
Filed April 4, 1957  3 Sheets-Sheet 1
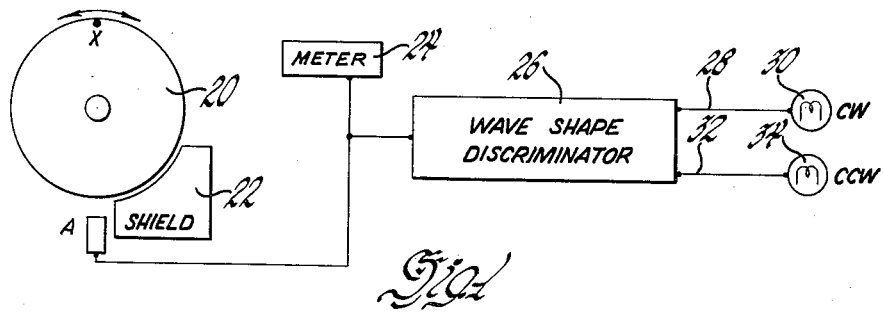
Fig. 1
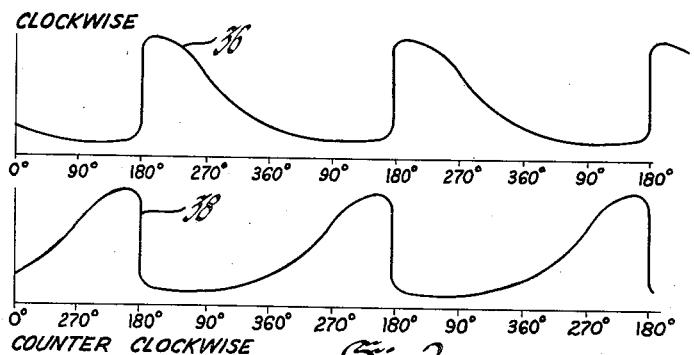
Fig. 2
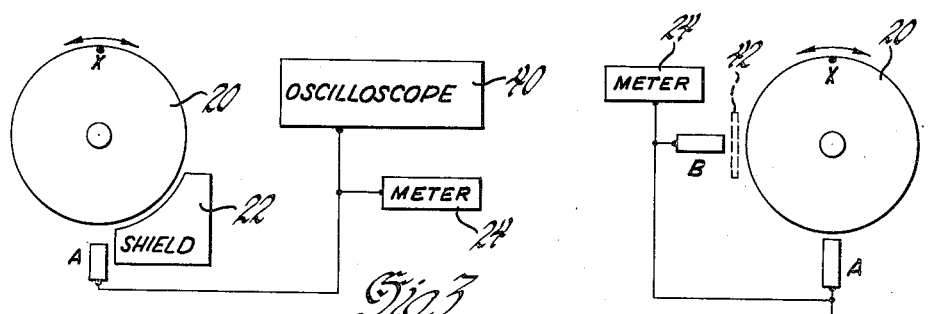
Fig. 3
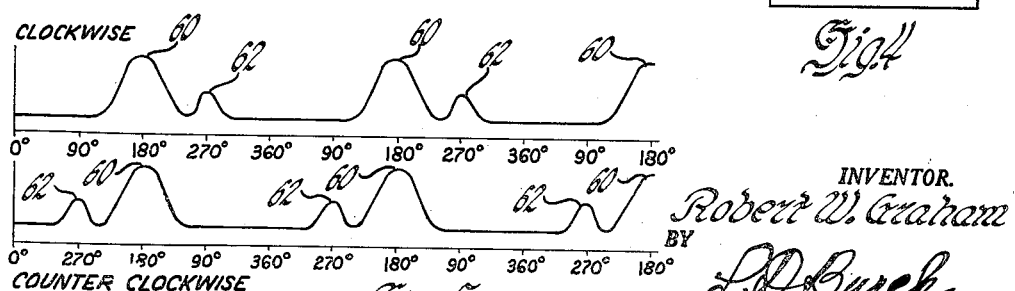
Fig. 4
Fig. 5
INVENTOR.
Robert W. Graham
BY
L. D. Burch
ATTORNEY.

April 4, 1961 R. W. GRAHAM 2,978,586
ROTATIONAL INDICATOR
Filed April 4, 1957 3 Sheets-Sheet 2

INVENTOR.
Robert W. Graham
BY
L. D. Burch
ATTORNEY.

April 4, 1961  R. W. GRAHAM  2,978,586
ROTATIONAL INDICATOR
Filed April 4, 1957  3 Sheets-Sheet 3

INVENTOR.
Robert W. Graham
BY
*[signature]*
ATTORNEY.

United States Patent Office 2,978,586
Patented Apr. 4, 1961

2,978,586
ROTATIONAL INDICATOR

Robert W. Graham, Birmingham, Mich., assignor to General Motors Corporation, Detroit, Mich., a corporation of Delaware Filed Apr. 4, 1957, Ser. No. 650,597

9 Claims. (Cl. 250—83.3)

The invention relates to a mechanism for determining rotational properties or characteristics of rotating elements, and more particularly to mechanisms for determining these properties when the rotating elements are not accessible for easy instrumentation or visual determination of rotational speed and/or direction. Numerous applications in the mechanical and electrical fields are found for mechanisms which accurately indicate the direction of rotation of a shaft or other components as well as the speed of rotation. It is often desirable to know the rotating conditions of an element which is completely enclosed in a housing or located within a mechanism so that normal instrumentation is not feasible and the element cannot be visually inspected. Examples include the testing of internal combustion engines, multi-element automatic transmissions, etc.

An indicating mechanism embodying the invention permits instantaneous and accurate determination of the direction of rotation of any rotating element as well as its speed. Such a mechanism is particularly useful for measuring the rotation of mechanical elements which cannot be reached by magnetic pickups or electrical slip rings. This is accomplished by use of a radio-active source of radiation and a radiation sensitive detector such as a Geiger tube, a scintillation detector and photo-multiplier tube assembly, or any other suitable type of detector. In order to properly interpret the impulses picked up by the detector, various mechanisms may be used including oscilloscopes, counters, tachometers, discriminators, etc. The information may be presented on an oscilloscope, a meter, suitably of the galvanometer type, or a system of indicating lights.

The mechanism works in a manner similar to that of a light bulb and a photoelectric cell. The light bulb, which is equivalent to a radioactive source such as cobalt[60], would be able to shine through various layers of smoked glass in a manner similar to the transmission of radiation rays through steel and oil. As the light bulb rotates with the rotatable element it moves toward and away from the photoelectric cell, which is equivalent to a Geiger-Müller tube or scintillation head. The cell sends out voltage pulses. When these pulses are counted on a frequency meter or on a time base oscilloscope, for example, a visual interpretation of the rotation of the element is provided. This system, using a cobalt[60] source, can measure rotations to a depth of a foot or more without contact with rotating parts.

There is a savings from the economic standpoint inasmuch as the investment of time and money is in the measuring instrument and not in the necessary adaptations to a given job using slip rings and magnetic pickups, which may require special adaptation. Almost any rotating part to which a pellet may be attached by threads or adhesives can be measured for speed and rotational direction by radiation.

In the drawings:

Figure 1 is a schematic diagram of a rotatable element with a mechanism embodying the invention;

Figure 2 is a chart showing the radiation induced waves produced in the mechanism of Figures 1 and 3 when the rotating element is rotating clockwise or counter clockwise;

Figure 3 shows diagrammatically a modification of the mechanism of Figure 1;

Figure 4 shows diagrammatically a further modification of the mechanism of Figure 1;

Figure 5 is a graphic presentation of the radiation induced waves in the mechanism of Figure 4;

Absorption factors for gamma rays, for example, are a function of the energy of the source and the atomic density of the material through which the rays are to pass. Absorbing materials have the two-fold effect of reducing the number of original rays and reducing the energy of the remaining portion of the rays passing through it. A minimum energy source may, therefore, be provided which will have unabsorbed rays only in an amount sufficient to actuate the detecting device used. When a scintillation head is used, each ray passing therein causes a small flash of light to appear in the crystal head. These flashes are amplified by the photo-multiplier tube of the head and thus become electric impulses. These impulses may be fed into a time-base discriminator in order to obtain the speed and/or direction of rotation.

When two sources of different activity are used, the discriminator will discriminate the time lapse between the passage of the high activity source by the detector head and the passage of the low activity source by the head and will relay the information as to whether the longer period of time separated the sources in an "XY" or a "YX" order. The discriminator permits only the pulses of a given energy to go through it to an integrator section. The integrator section sums up all of the individual pulses of one revolution and emits those pulses as one standard pulse which can be fed to a tachometer or frequency meter.

Figure 8:
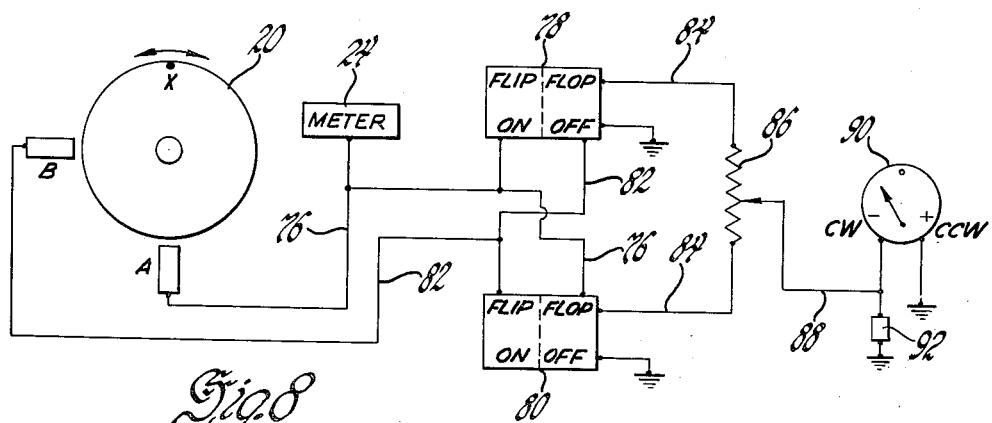
Figure 8 illustrates a further modification of the mechanism of Figure 1.
Figure 10:
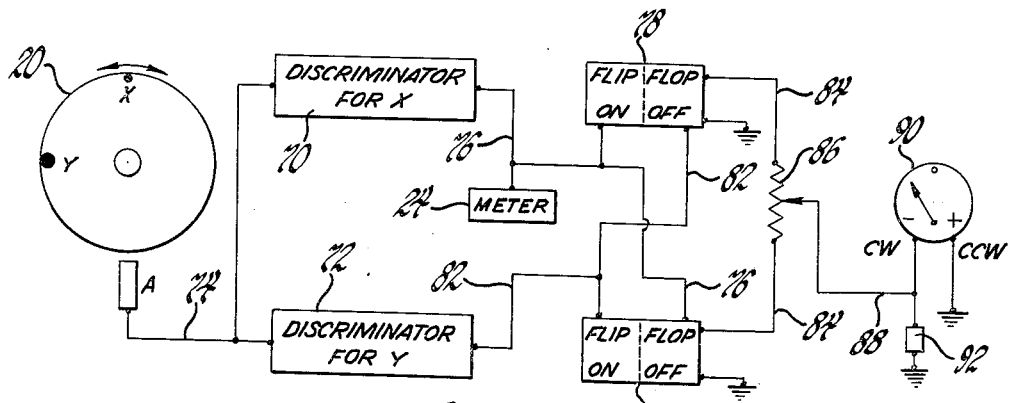
Figure 10 shows a modification of the mechanism of Figure 8.

The discriminators can be either electrical or mechanical in design and may discriminate among the following properties: pulse height, pulse width, pulse shape, source strength, source energy and source type. The discriminators may be a complex setup of electronic tubes and/or electronic filters, or they may be a peaking coil as would be used in pulse shapes shown in Figure 2. Mechanical devices such as a pair of detectors may also be used, with one detector being shielded, as is shown in Figure 4, thus requiring a larger source energy or strength level to trigger an output signal from the detector. The wave shape discriminator used in the mechanism illustrated by Figures 1 and 11 may be comprised of peaking coils with rectifiers which feed the pilot lights with either a positive or a negative voltage and select the correct pilot light. This positive or negative voltage may be fed to a meter, suitably of the galvanometer type, as is shown in Figures 8 and 10, and the indication of either positive or negative voltage will indicate the direction of rotation.

The rotational speed and direction indicator of Figure 1 indicates the rotating characteristics of a rotating element 20. A radiation source X may be located in the outer periphery of rotating element 20. A radiation indicator A is positioned adjacent the rotating element and substantially in the plane defined by the rotation of radiation source X. Source X then passes in front of detector A once for each revolution of rotating element 20. A radiation shield 22 is positioned immediately adjacent detector A and extends circumferentially around a portion of element 20. As source X rotates past shield 22, the radioactive sensitive portion of detector A is shielded from the radiation of source X. Detector A is electrically connected to a tachometer or revolutions counter 24. Meter 24 is activated each time source X passes immediately adjacent indicator A, and may be a tachometer, frequency meter or a counter.

Detector A is also electrically connected to a wave shape discriminator 26. An electrical circuit 28 leading from discriminator 26 is connected to a pilot light 30 which, when lighted, indicates clockwise rotation of rotating element 20. A second electrical circuit 32 leads from discriminator 26 and is connected to pilot light 34. This light, when energized, indicates counterclockwise rotation of rotational element 20. Wave shape discriminator 26 may be of any well-known type which will discriminate between waves generated by detector A which are shaped similar to waves 36 and 38 of Figure 2. When the rotating element 20 is rotating in a clockwise direction wave 36 is generated in detector A. Wave 38 is generated when rotating element 20 is rotating in a counterclockwise direction. The presence of radiation shield 22 changes waves 36 and 38 from what would normally be a sine wave to those configurations shown in Figure 2. When rotating element 20 is rotating in a clockwise direction, source X approaches indicator A behind shield 22 and emerges from that shield only when source X is immediately adjacent detector A. As element 20 continues to rotate, source X moves away from detector A and the radiation strength received by detector A is lessened in accordance with the square of the distance of source X from the radiation-sensitive portion of detector A and the additional absorption due to the shielding action of element 20. When rotating element 20 is turning in a counterclockwise direction, detector A is not shielded from source X as the source approaches the detector, giving a gradually increasing curve with a maximum amplitude occurring when source X is immediately adjacent detector A. Source X then passes behind shield 22 and the majority of the radiation effects are shielded from detector A, giving a sudden decrease in amplitude of the wave generated.

Instead of using a wave shape discriminator and a pair of pilot lights, an oscilloscope presentation may be obtained by use of the modification shown in Figure 3. The oscilloscope 40 will have a wave presentation similar to one or the other of waves 36 and 38 of Figure 2.

The modification illustrated in Figure 4 uses a single radiation source X and two detectors A and B which are circumferentially spaced around element A with an included angle substantially less than 180 degrees. One of the detectors, B in this instance, may have a shield 42 in front of it to cause a weaker signal to be generated when source X passes it. If this is not sufficient or desirable, one of the detectors may be positioned radially further away from the circular path of source X, thereby generating a weaker signal than the other detector. A combination of the two methods may also be used for maximum signal difference. Oscilloscope 40 of Figure 4 will give a wave presentation similar to that shown in Figure 5. A tachometer or revolutions counter 24 may also be provided.

Figure 11:
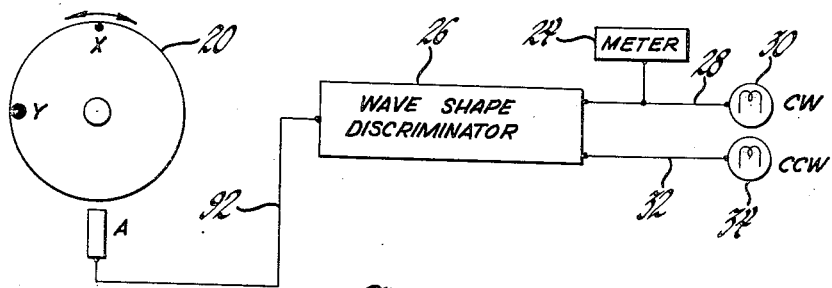
Figure 11 shows a modification of the mechanism shown in Figure 6.

A pair of radiation sources X and Y may be used if desired. The two sources are preferably spaced arcuately about the periphery of rotating element 20 and in the same rotating plane with an included angle substantially less than 180°. The sources may be either of different strengths, different radiation type sources, or identical sources. A single detector A may be used to detect radiations from each of the sources as illustrated in Figures 6, 10 and 11.

Figure 6:
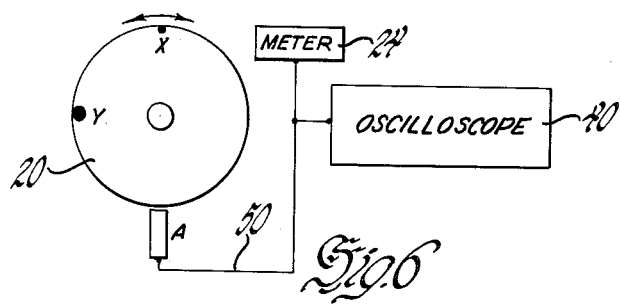
Figure 6 shows a modification of the system shown in Figure 1 using two radiation sources.
Figure 7:
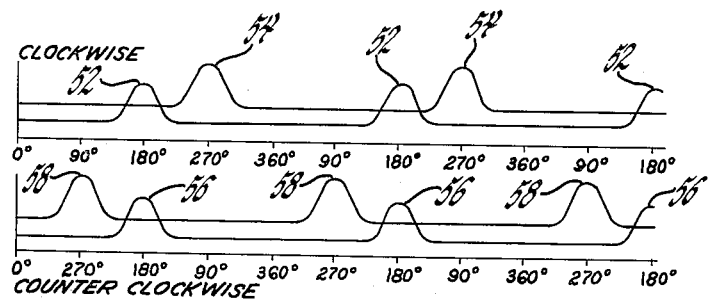
Figure 7 is a graphic presentation of the radiation induced waves in the mechanism of Figure 6.

The system shown in Figure 6 includes an electrical circuit 50 to which are connected a tachometer or counter 24 and an oscilloscope 40. The oscilloscope presentation given by the mechanism of Figure 6 is a result of the individual wave curves illustrated in Figure 7 for clockwise or counterclockwise rotational directions of element 20 when the radiation sources are of unequal strength. Separate base lines are illustrated in Figure 7 merely to show the individual curves. The wave presentation relating to source X, which may be considered to be the weaker source, is shown by curve 52 and the wave presentation relating to source Y is shown by curve 54 when rotating element 20 is rotating in a clockwise direction. When element 20 is rotating counterclockwise, curves 56 and 58 respectively relate to radiation sources X and Y. Since each of the sources energize detector A, the resulting oscilloscope presentations will be similar to the curves shown in Figure 5. The larger pip 60 will immediately precede the smaller pip 62 when element 20 is rotating clockwise, while the smaller pip 62 will immediately precede the larger pip 60 when element 20 is rotating counterclockwise. The difference in relative size of these pips is due to the gain or amplitude resulting from the difference in received radiation strength.

The radiations produced by sources X and Y of Figure 10 may be of different types, and discriminators 70 and 72 may be respectively provided to discriminate between the signals received from each of the sources. Should radiation sources X and Y be of a similar nature but of different intensity, the discriminators 70 and 72 may be designed to discriminate between signal intensities. Electrical circuit 74 leading from detector A is connected to discriminators 70 and 72. These discriminators are in parallel. Electrical lead 76 connects discriminator 70 with the "on" side of a switch control or flip-flop mechanism 78 and the "off" side of switch control or flip-flop mechanism 80. Lead 82 connects discriminator 72 with the "on" side of flip-flop mechanism 80 and the "off" side of flip-flop mechanism 78. A circuit 84 containing a zeroable resistor 86 connects the "off" sides of flip-flop mechanisms 78 and 80. A lead 88 from the adjustable center section of resistor 86 is connected in series with a meter 90. An integrator 92 may be connected to lead 88 or an integrator may be built into meter 90. This meter is calibrated to indicate whether element 20 is rotating in a clockwise or counterclockwise direction, as explained below and illustrated in Figure 9.

Figure 9:
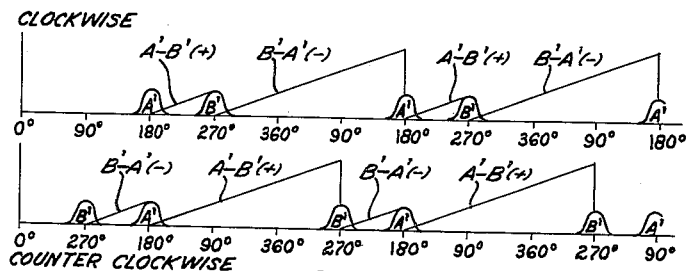
Figure 9 is a graphic presentation of the electrical impulses generated in the detectors of Figure 8.

When the pulse received originates in detector A and is caused by radiation source X, discriminator 70 actuates flip-flop mechanism 78, turning circuit 84 on and transmitting a current having a predetermined, e.g. positive, voltage to meter 90. At the same time, the flip-flop mechanism 80 is turned off and no voltage originating from the signal caused by radiation source Y is transmitted to meter 90. As rotating element 20 continues to rotate in a clockwise direction, source Y then actuates detector A and discriminator 72 passes an appropriate electric current through circuit 82 which turns flip-flop mechanism 80 on and flip-flop mechanism 78 off. An electric current having a predetermined, e.g. negative, voltage then passes to meter 90 from flip-flop mechanism 80. By providing time-base discriminators, voltage impulses such as those shown in Figure 9 are obtained. When element 20 is rotating clockwise, pip $A^1$ will be caused by the passage of source X past detector A. Pip $B^1$ will be caused by the passage of source Y past detector A. The time differential in which voltage is then built up results in a (positive) voltage strength proportional to the time $A^1$—$B^1$. Since there is a longer period of time before pip $A^1$ again appears, the (negative) voltage build-up proportional to $B^1$—$A^1$ is considerably greater. By adding the $A^1$—$B^1$ "on" time (positive) voltage to the B¹—A¹ "on" time (negative) voltage a negative voltage will be obtained, causing the meter 90 to read negatively. This negative reading will be equal to clockwise rotation. Similarly, a positive reading, equal to counterclockwise rotation, is obtained when element 20 is rotating counterclockwise.

When a single source X is used with two detectors A and B, as shown in Figure 8, the signal originating in each detector actuates flip-flop mechanisms 78 and 80, as described above, to give either a positive or a negative current reading on meter 90.

The mechanism diagrammatically illustrated in Figure 11 is a modification of the mechanisms of Figure 6 and uses the indication system shown in Figure 1. Two radiation sources X and Y are provided which are of different strength. A single detector A is used to pick up radiation from each source as it revolves past. An impulse is generated in lead 92 and transmitted to discriminator 26. Depending on the order of the sources initiating successive impulses, the discriminator generates a current in either lead 28 or lead 32. The discriminator 26 is sensitive to wave shapes and waves similar to those in Figures 5 and 7 are differentiated. Pilot light 30 is illuminated if a clockwise wave shape is received, while pilot light 34 is illuminated if a counterclockwise wave shape is received.

The mechanisms herein disclosed and in which the invention is embodied provide novel and effective determinations of the rotational characteristics of rotating bodies. There need be no direct mechanical or electrical connection between a rotating body and the instruments employed in measuring and indicating these characteristics. The information obtained may be presented as desired to permit its most effective utilization under any given circumstances.

I claim:

1. In a device for determining rotational properties of a rotatable body, a source of radiation secured for rotation with said body about the axis of said body, two radiation detectors radially spaced from and circumferentially spaced about said body, each of said detectors being capable of inducing a wave having its amplitude determined by variations in the radiation strength received from said radiation source during rotation of said body, and means for indicating said rotational properties of said body, said means being controlled by said induced waves.

2. In combination in a mechanism for determining rotational properties of a rotatable member, a radiation source secured to said member and radially spaced from the axis thereof, a radiation detector mounted near said member but radially spaced therefrom in the plane defined by said radiation source when said member is rotated, a radiation shield mounted in said plane and adjacent said detector and said member, a wave shape discriminator connected with said detector, a pair of parallel electrical circuits connected with said discriminator, each of said circuits having a pilot light, said detector being adapted to sense variations in radiation strength produced by said source relative to said detector when said member is rotated, said detector inducing an electrical impulse having an irregular wave shape, said irregularity resulting from the radiation shielding action of said shield, said discriminator actuating one or the other of said pair of circuits in accordance with the disposition of said wave shape whereby one of said pilot lights is lighted, said wave shape disposition depending upon the direction of rotation of said rotatable member.

3. In combination in a mechanism for determining rotational properties of a rotatable member, a radiation source secured to said member and radially spaced from the axis thereof, a radiation detector mounted near said member and radially spaced therefrom in the plane defined by said radiation source when said member is rotated, a radiation shield mounted in said plane and adjacent said detector, an oscilloscope connected with said detector, said detector being adapted to control energization of said oscilloscope in accordance with variations in radiation strength received by said detector from said radiation source when said member is rotated, whereby said oscilloscope provides a visual presentation of the wave form produced by energization variations received from said detector.

4. Means for determining rotational characteristics of a remote rotatable element, said means including a radiation source secured to said element in radially spaced relationship to the axis thereof, a first radiation detector and a second radiation detector circumferentially spaced about said rotatable element, said detectors being substantially in the plane defined by said radiation source when said element is rotated, said detectors being adapted to sense radiation strength variations from said source when said element is rotated, said first detector being adapted to receive a weaker radiation strength signal than the said second detector, an oscilloscope, said detectors being electrically connected to said oscilloscope through a common circuit and transmitting varying strength electrical impulse waves to said oscilloscope proportional to the radiation strength variations sensed, said oscilloscope providing a visual presentation of said radiation strength variations in which said first detector initiates higher gain pips than said second detector.

5. The mechanism of claim 4 in which said second detector is impeded by a radiation shield intermediate said detector and said rotatable element.

6. The mechanism of claim 4 in which said second detector is radially positioned a greater distance outward from the axis of said rotatable element than said first detector whereby said first detector is capable of sensing weaker radiation strength signals than said second detector.

7. Means for determining the direction of rotation of an inaccessible rotating element including a first radiation source and a second radiation source, said second source having at least one different radiation characteristic from said first source, said sources being mounted for rotation with said rotatable element about the axis thereof and defining a plane when said element is rotated, a radiation detector mounted substantially in said plane and radially spaced from said rotating element and adapted to receive radiation characteristic variations from said sources when said element is rotated, and means for visually presenting said radiation characteristic variations whereby the direction of rotation of said element is determinable.

8. The mechanism of claim 7, said visual presentation means including a first discriminator for discriminating impulses emanating from said first radiation source and a second discriminator for discriminating impulses emanating from said second radiation source, first and second switch control mechanisms interconnected with said discriminators and actuated thereby, an electrical circuit controlled by said switch control mechanisms, said electrical circuit having a meter therein, said switch control mechanisms determining the polarity of electrical flow in said circuit whereby said meter indicates the polarity of said flow as a function of the direction of rotation of said rotatable element.

9. Means for determining a rotational characteristic of a rotatable member, said means including a radiation source peripherally mounted on said member, first and second radiation detectors radially spaced from and circumferentially spaced about said member substantially in a plane defined by said radiation source when said member is rotated, a first electrical circuit connected with said first detector and a second electrical circuit connected with said second detector, first and second switch control mechanisms each having an on side and an off side, said first circuit being connected to the on side of said first switch control mechanism and to the off side of said second switch control mechanism, said second circuit being connected to said second detector and to the off side of said first switch control mechanism and to the on side of said second switch control mechanism, a third electrical circuit connected with and controlled by said switch control mechanisms, said third circuit including a variable resistor and a meter, said detectors being adapted to receive radiation impulse variations from said radiation source when said member is rotated and initiating electrical impulses determined by said radiation strength variations, said impulses alternately controlling said switch control mechanisms whereby a direct current is caused to flow in said third circuit, the direction of electrical flow in said third circuit being indicated by said meter and determined by the direction of rotation of said rotatable member.

References Cited in the file of this patent

UNITED STATES PATENTS

| | | |
|---|---|---|
| 2,683,813 | Friedman | July 13, 1954 |
| 2,692,951 | Voelker | Oct. 26, 1954 |

FOREIGN PATENTS

| | | |
|---|---|---|
| 703,712 | Great Britain | Feb. 10, 1954 |

OTHER REFERENCES

A Single Direction-Sensitive Phototransistor Circuit for Use in Optical Pulse-Counting Systems, by Bane et al., Journal of Scientific Instruments, pages 483–486, vol. 33, December 1956.